(12) United States Patent
Wang et al.

(10) Patent No.: US 11,307,923 B2
(45) Date of Patent: Apr. 19, 2022

(54) MEMORY LEAK DETECTION

(71) Applicant: VMware, Inc., Palo Alto, CA (US)

(72) Inventors: Yong Wang, San Jose, CA (US); Xinhua Hong, Campbell, CA (US); Jia Yu, San Jose, CA (US); Eduard Serra Miralles, Redwood City, CA (US)

(73) Assignee: VMWARE, INC., Palo Alto, CA (US)

( * ) Notice: Subject to any disclaimer, the term of this patent is extended or adjusted under 35 U.S.C. 154(b) by 446 days.

(21) Appl. No.: 16/520,318

(22) Filed: Jul. 23, 2019

(65) Prior Publication Data
US 2021/0026721 A1 Jan. 28, 2021

(51) Int. Cl.
G06F 11/07 (2006.01)
G06F 9/455 (2018.01)
H04L 49/90 (2022.01)

(52) U.S. Cl.
CPC ........ G06F 11/079 (2013.01); G06F 9/45558 (2013.01); G06F 11/0709 (2013.01); G06F 11/0712 (2013.01); G06F 11/0751 (2013.01); G06F 11/0793 (2013.01); H04L 49/90 (2013.01); G06F 2009/45583 (2013.01)

(58) Field of Classification Search
CPC .... G06F 11/079; G06F 11/0793; G06F 11/30; G06F 11/3037; G06F 11/301; G06F 11/0709; G06F 11/0712; G06F 11/07; G06F 11/0751; H04L 49/90
See application file for complete search history.

(56) References Cited

U.S. PATENT DOCUMENTS

| | | | |
|---|---|---|---|
| 6,918,005 B1 * | 7/2005 | Marchant | G06F 12/023 710/54 |
| 7,293,142 B1 * | 11/2007 | Xu | G06F 11/3648 707/999.202 |
| 8,688,922 B1 * | 4/2014 | Assmann | G06F 13/28 711/152 |
| 2004/0123038 A1 * | 6/2004 | Shami | H04L 49/901 711/132 |
| 2009/0048995 A1 * | 2/2009 | Mahajan | H04L 41/064 706/46 |
| 2012/0072779 A1 * | 3/2012 | Takai | G06F 11/073 714/47.1 |
| 2013/0132699 A1 * | 5/2013 | Vaishampayan | G06F 11/073 711/170 |
| 2014/0067912 A1 * | 3/2014 | Vutukoori | G06F 11/0748 709/203 |

(Continued)

Primary Examiner — Yolanda L Wilson
(74) Attorney, Agent, or Firm — Su IP Consulting

(57) ABSTRACT

Example methods and systems for memory leak detection. One example may comprise: identifying a set of memory buffers that are available for storing packet information that requires processing by the network device; a first subset that includes one or more first memory buffers that are unallocated, and a second subset that includes one or more second memory buffers that are allocated and storing packet information that is being processed by the network device. The method may also comprise: performing a comparison between (a) the set of memory buffers and (b) the first subset and the second subset; and based on the comparison, identifying a third subset that includes one or more third memory buffers, being leaked memory buffers, that are storing packet information that is no longer being processed by the network device.

21 Claims, 6 Drawing Sheets

(56) References Cited

U.S. PATENT DOCUMENTS

| | | | | |
|---|---|---|---|---|
| 2014/0068351 | A1* | 3/2014 | Rhee | G06F 11/3604 |
| | | | | 714/47.3 |
| 2016/0321130 | A1* | 11/2016 | Takamiya | G06F 12/0253 |
| 2017/0083426 | A1* | 3/2017 | Stone | G06F 11/364 |
| 2017/0277466 | A1* | 9/2017 | Weld | G06F 9/5016 |
| 2018/0089007 | A1* | 3/2018 | Gottschlich | G06F 11/3051 |
| 2020/0042371 | A1* | 2/2020 | Park | G06F 11/3612 |

* cited by examiner

MEMORY LEAK DETECTION

BACKGROUND

Virtualization allows the abstraction and pooling of hardware resources to support virtual machines in a Software-Defined Networking (SDN) environment, such as a Software-Defined Data Center (SDDC). For example, through server virtualization, virtual machines (VMs) running different operating systems may be supported by the same physical machine (e.g., referred to as a "host"). Each VM is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture. In practice, network device(s) may be deployed in the SDN environment to perform packet processing to facilitate communication among endpoints, such as VMs, etc. However, network device(s) may be susceptible to memory leaks that cause performance degradation and network functionality disruption over time, possibly leading to system crashes.

DETAILED DESCRIPTION

Figure 1:
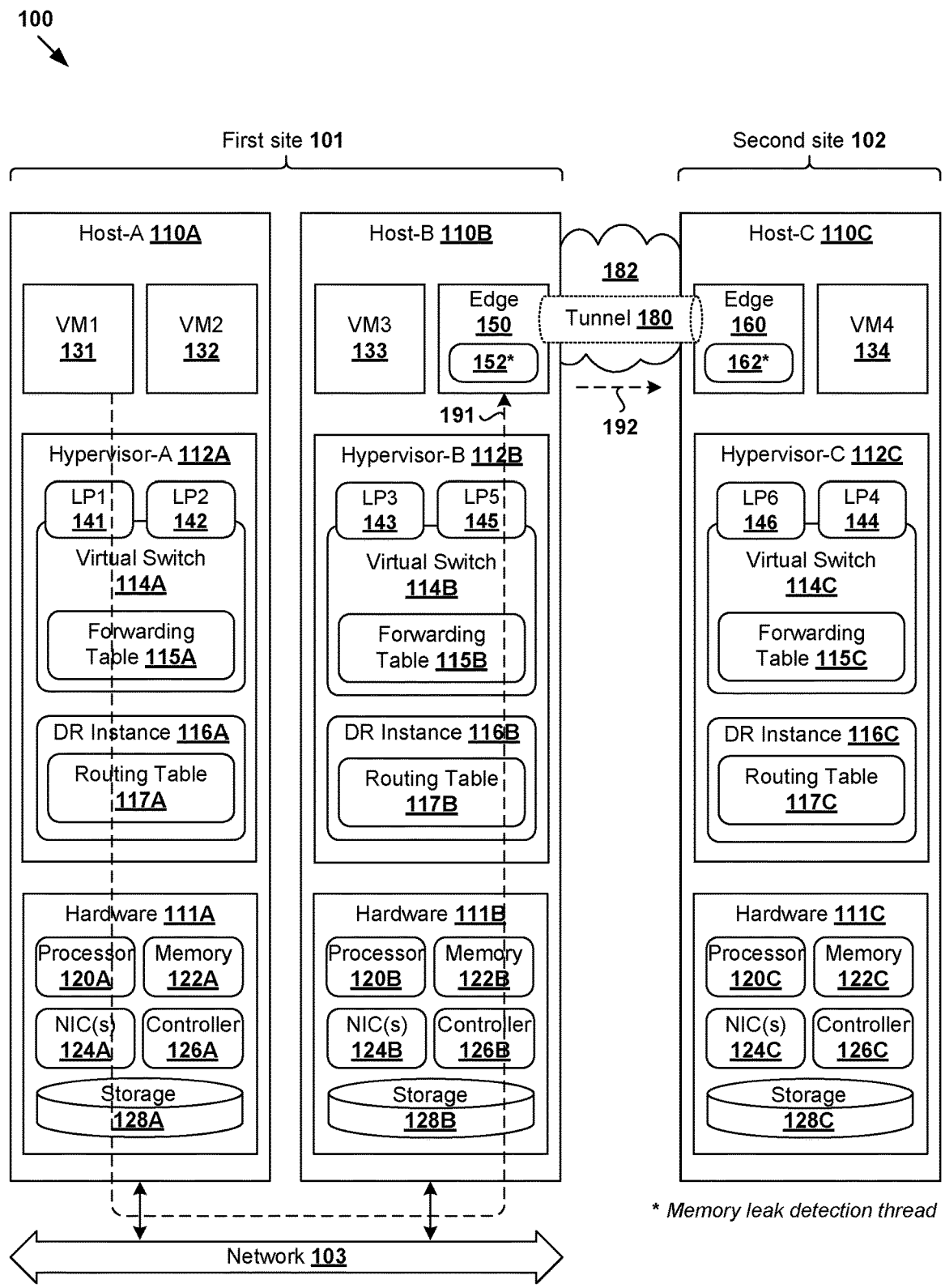
FIG. 1 is a schematic diagram illustrating an example software-defined networking (SDN) environment in which memory leak detection may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and "third" are used to describe various elements, these elements should not be limited by these terms. These terms are used to distinguish one element from another. For example, a first element may be referred to as a second element, and vice versa.

Challenges relating to packet processing by network devices will now be explained using FIG. 1 and FIG. 2. In particular, FIG. 1 is a schematic diagram illustrating an example software-defined networking (SDN) environment 100 in which memory leak detection may be performed. It should be understood that, depending on the desired implementation, SDN environment 100 may include additional and/or alternative components than that shown in FIG. 1 and FIG. 2. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

Referring first to FIG. 1, SDN environment 100 includes multiple hosts, such as host-A 110A, host-B 110B and host-C 110C. In practice, hosts 110A-C may be located at geographically dispersed sites (see 101-102), such hosts 110A-B at a first site and host-C 110C at a second site. To facilitate communication among hosts 110A-C over physical network 182, first network device 150 ("first edge") may be deployed at the edge of the first site, and second network device 160 ("second edge") at the edge of the second site. As used herein, the term "network device" (used interchangeably with "edge" 150/160) may refer generally to an entity, computer system appliance, or the like, that is capable of performing functionalities of a switch, router (e.g., logical service router), bridge, gateway, edge appliance, or any combination thereof. It should be understood that edge 120 may be implemented using one or more virtual machines (VMs) and/or physical machines (also known as "bare metal machines").

In the example in FIG. 1, first edge 150 and second edge 160 may be VMs supported by respective host-B 110B and host-C 110C. Hosts 110A-C may each include suitable hardware and virtualization software (e.g., hypervisors 112A-C) to support various VMs. For example, at the first site, host-A 110A supports VM1 131 and VM2 132, and host-B 110B supports first edge 150 and VM3 133. At the second site, host-B 110B supports second edge 160 and VM4 134. In alternative implementation(s), it should be understood that edge 150/160 may be supported by a different host. Host-A 110A and host-C 110C may be connected via any suitable physical network 103.

Hypervisor 112A/112B/112C maintains a mapping between underlying hardware 111A/111B/111C and virtual resources allocated to the VMs. Hardware 111A/111B/111C includes various physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processing unit (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

In practice, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

The VMs (e.g., VMs 131-134, 150 and 160) may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Through virtualization of networking services in SDN environment 100, logical overlay networks may be provisioned, changed, stored, deleted and restored programmatically without having to reconfigure the underlying physical hardware architecture. Any suitable protocol(s) may be used to facilitate communication via logical overlay networks, Generic Routing Encapsulation (GRE), Internet Protocol Security (IPSec), Virtual eXtensible Local Area Network (VXLAN), Stateless Transport Tunneling (STT), Virtual Local Area Network (VLAN), Generic Network Virtualization Encapsulation (GENEVE), Network Virtualization using Generic Routing Encapsulation (NVGRE), Layer 2 Tunneling Protocol (L2TP), any combination thereof, etc. For example, VM1 131 on host-A 110A and VM4 134 on host-C 110C may be connected to the same logical switch and located on the same logical layer-2 segment, such as a segment with VXLAN (or "virtual") network identifier (VNI)=100.

North-south traffic (see 191-192 in FIG. 1) between VM1 131 at first site 101 and VM4 134 at second site 102 may be forwarded via respective first edge 150 and second edge 160. Depending on the desired implementation, first edge 150 and second edge 160 may communicate via a Virtual Private Network (VPN), such as Layer-2 VPN (L2VPN), Layer-3 VPN (L3VPN), etc. In this case, tunnel 180 may be established using any suitable protocol(s) to facilitate packet forwarding over physical network 182. First edge 150 and second edge 160 may be connected via any suitable intermediate device(s) in physical network 182.

Figure 2:
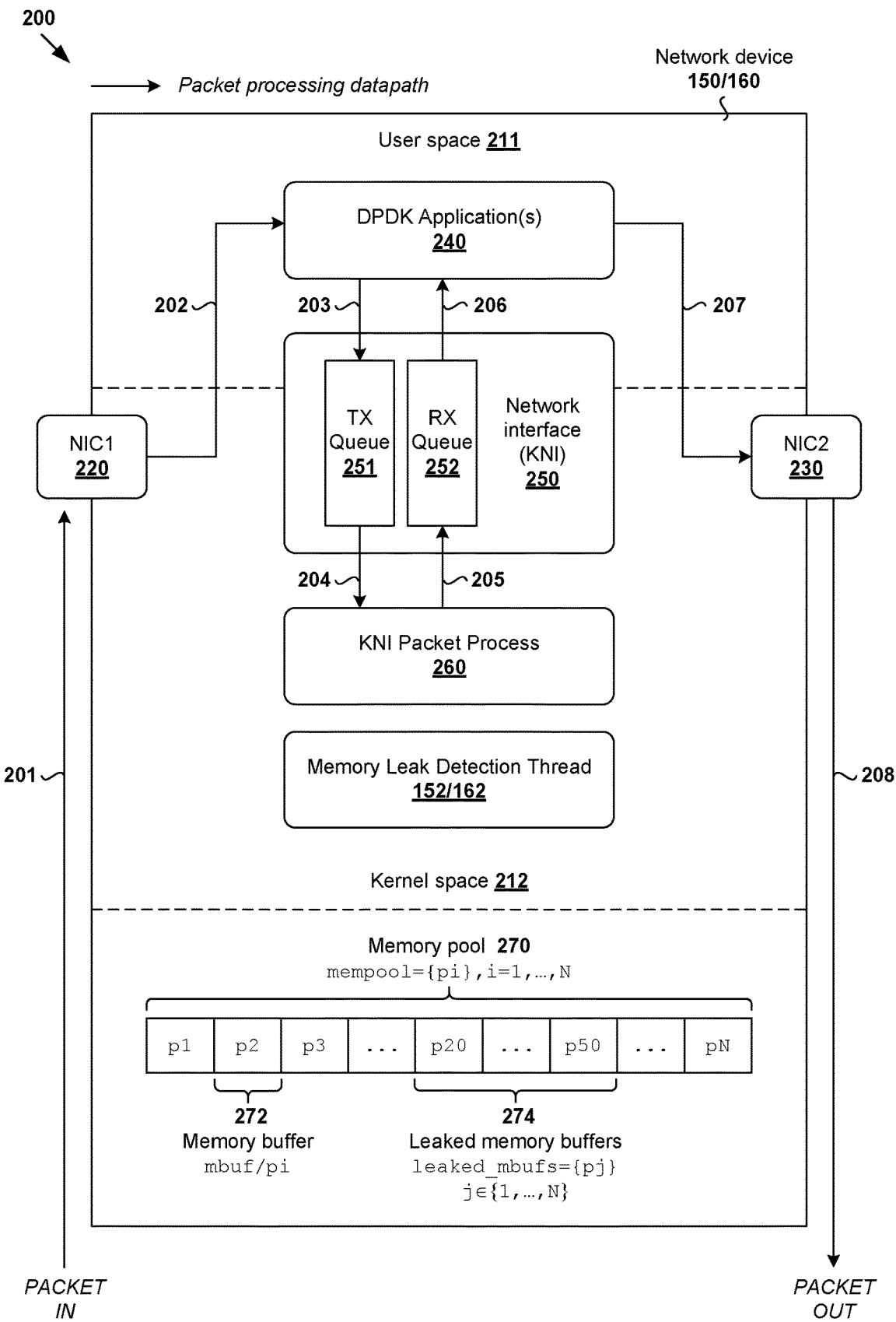
FIG. 2 is a schematic diagram illustrating an example architecture of a network device configured to perform memory leak detection.

FIG. 2 is a schematic diagram illustrating example architecture 200 of a network device configured to perform memory leak detection. In this example, example network device in the form of edge 150/160 may support any suitable packet processing engine(s). One example is the Data Plane Development Kit (DPDK) that provides a set of data plane libraries and (physical and/or virtual) NIC drivers to accelerate fast packet processing at network device 150/160. In this case, edge 150/160 may include DPDK application 240 residing in user space 211 and kernel NIC interface (KNI) packet process 260 residing in kernel space 212. Traffic that travels between DPDK application 240 and KNI packet process 260 is handled by network interface 250 (e.g., KNI). KNI 250 supports transmit (TX) and receive (RX) queues 251-252, which may be shared-memory-based queues that are accessible by both DPDK application 240 and KNI packet process 260.

One example packet processing datapath of edge 150/160 will be explained using 201-208. At 201-202, in response to detecting a packet at first NIC1 220, the packet may be directed to DPDK application 240 in user space 211. At 203, DPDK application 240 may direct the packet to network interface 250 via TX queue 251. At 204-205, KNI packet process 260 may poll packet(s) from TX queue 251 before performing any necessary packet processing and pushing the packet(s) into RX queue 252 of network interface 250. At 206, DPDK application 240 may operate in a polling mode to poll packet(s) from RX queue for any necessary packet processing. At 207-208, DPDK application 240 may forward packet(s) to second NIC2 230. It should be noted that a particular ingress packet (see 201-204) is not necessarily the same as an egress packet (see 205-208) shown in FIG. 2.

Any suitable "packet processing" may be performed by edge 150/160. For example, edge 150/160 may implement a logical service router (SR), which represents a centralized routing component for providing various service(s) to respective VMs 131-134. Depending on the service provided, edge 150/160 may perform packet processing operation(s) relating to any one of the following: service insertion, virtual private network (VPN) support, firewall protection, load balancing, network address translation (NAT), intrusion detection, deep packet inspection, traffic shaping, traffic optimization, packet header enrichment or modification, packet tagging, packet encryption or decryption, metadata configuration, or any combination thereof, etc.

To perform packet processing, edge 150/160 requires access to memory to store packets. For example, as a packet is processed along the datapath (201-208) using various components (e.g., NIC 220/230, DPDK application 240, KNI 250 and KNI packet process 260), the packet may be stored in memory buffer 272 (mbuf) that is allocated from "memory pool" 270 (mempool). Using DPDK, a "memory pool" may represent an allocator of a fixed-sized object, such as size=2 KB for a regular packet buffer, and size=9 KB for a jumbo frame buffer. Memory pool 270 is generally implemented as a ring buffer for efficient lockless access. The term "memory buffer" may refer generally to an amount of memory from memory pool 270.

The term "memory leak" may refer generally to a situation where a memory buffer is not deallocated (i.e., freed) after it is no longer in use. For example, once a packet in a memory buffer has been processed, the memory buffer should be freed such that it is available for re-allocation. In practice, memory leaks may be difficult to identify. One conventional method is to monitor the usage of memory buffers. Once a predetermined threshold is reached (e.g., 95% of all memory buffers are used), an alarm may be sent to a management plane to warn that a potential exhaustion of memory buffers might occur. Edge 150/160 also restarts the datapath to free enough memory buffers.

Restarting or rebooting the datapath is generally not ideal because packet processing will be disrupted. This in turn affects the availability and reliability of edge 150/160 configured to perform high-speed packet processing. Also, the management plane may have to re-push the relevant configuration information to edge 150/160 and re-establish its runtime state. Over time, a memory leak usually degrades performance as the amount of available memory decreases. If undetected, network functionality at edge 150/160 may fail due to out-of-memory errors, causing traffic to stall and possibly a system crash.

Memory Leak Detection

Figure 3:
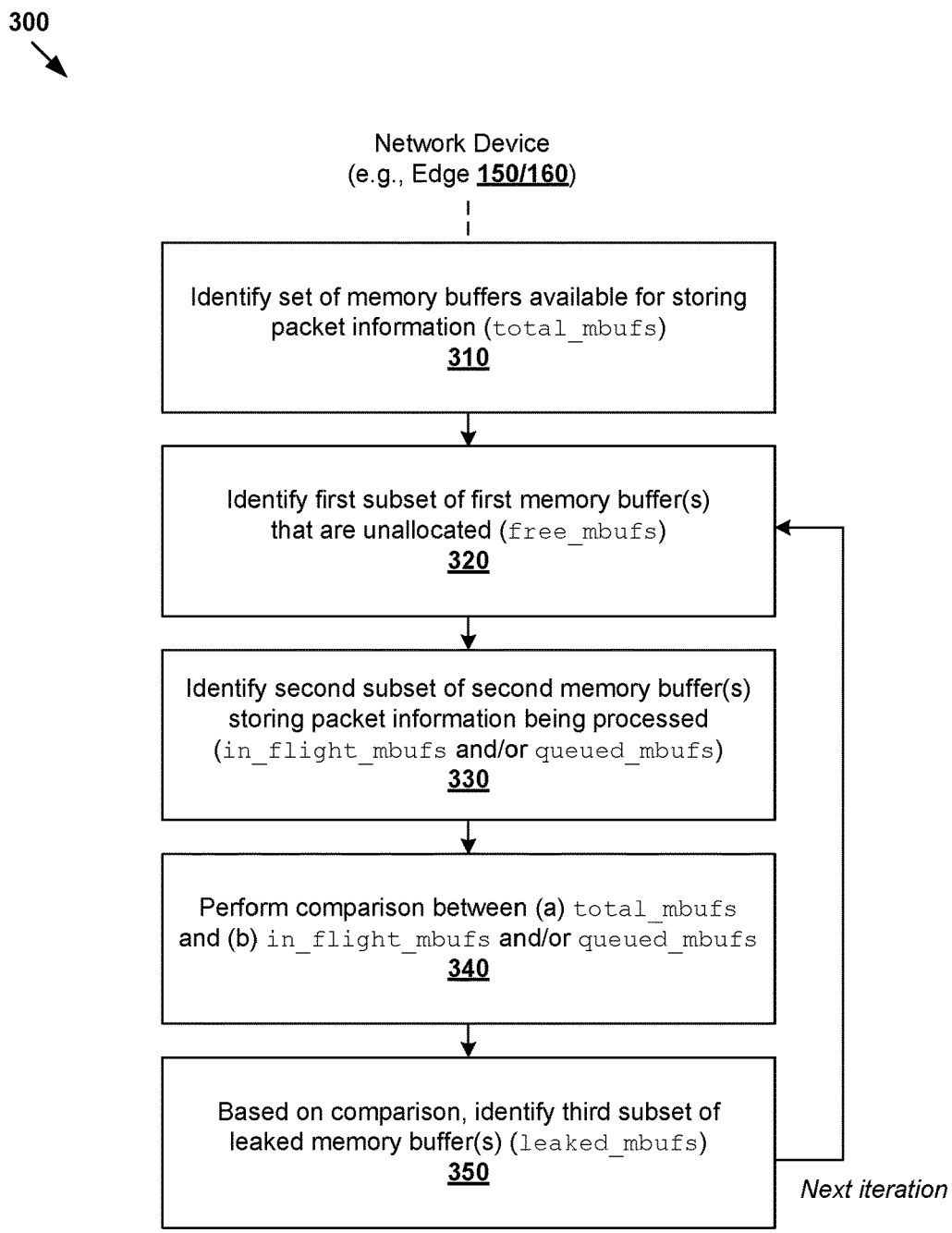
FIG. 3 is a flowchart of an example process for a network device to perform memory leak detection.

According to examples of the present disclosure, memory leak detection may be performed automatically at runtime to improve the availability and reliability of edge 150/160. In more detail, FIG. 3 is a flowchart of example process 300 for a network device to perform memory leak detection in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. Throughout the present disclosure, various examples may be implemented by any suitable "network device," such as edge 150/160 using memory leak detection thread 152/162, etc.

At 310 in FIG. 3, edge 150/160 may identify a set of memory buffers (denoted as total_mbufs) available on edge 150/160 for storing packet information that requires processing by edge 150/160. At 320 and 330, edge 150/160 may identify a first subset (denoted as free_mbufs) that includes first memory buffer(s) that are unallocated, and a second subset that includes second memory buffer(s) that are allocated and storing packet information that is being processed by edge 150/160.

As will be described further using FIG. 4, block 330 may involve identifying second memory buffer(s) storing packet information that is being processed by a component of edge 150/160, or being queued for processing by the component (denoted as in_flight_mbufs and queued_mbufs, respectively). Any suitable "component" along datapath 201-208 of edge 150/160 may be used, including but not limited to NIC 220/230, DPDK application 240, KNI 250, KNI packet process 260. Any suitable "queue" or "ring buffer" may be used for queuing packets, such as NIC queue, cryptographic queue, KNI queue, inter-core queue, packet reassembly queue, etc.

At 340 in FIG. 3, edge 150/160 may perform a comparison between (a) the set of memory buffers and (b) the first subset and the second subset. This way, at 350, edge 150/160 may identify a third subset (denoted as leaked_mbufs) that includes third or leaked memory buffer(s) storing packet information that is no longer being processed by edge 150/160. See also 274 in the example in FIG. 2. Depending on the desired implementation, block 350 may involve determining that a particular leaked memory buffer from the third subset is not a false positive (i.e., mistakenly included in the third subset). In one example, an elapsed time since the particular leaked memory buffer is identified may be monitored. In response to determination that the elapsed time exceeds a predetermined threshold, it is determined that the particular leaked memory buffer is not a false positive.

Using examples of the present disclosure, remediation action(s) may be performed automatically. A first remediation may be performed to deallocate or free a particular leaked memory buffer from the third subset. By resolving the memory leak automatically, it is not necessary to restart the datapath or involve a user's manual intervention, thereby reducing disruption to regular networking functions of edge 150/160. Additionally or alternatively, a second remediation action may be performed to dump content of the particular leaked memory buffer to a file for analysis and debugging. This way, a possible source of the memory leak may be identified based on the content (e.g., packet header information and/or payload information).

According to examples of the present disclosure, edge 150/160 may implement memory leak detection and remediation at runtime by executing memory leak detection thread 152/162 (see FIG. 1 and FIG. 2). To reduce overhead (e.g., per-packet overhead), detection thread 152/162 may be a separate thread from other packet processing components and "wake up" periodically. In this case, detection thread 152/162 may perform block 310 at initialization, and blocks 320-350 periodically. As used herein, the term "thread" may refer generally to a sequence of program code information that is executed by a processor in a computing environment where multiple sequences (threads) may be executed in parallel. Detection thread 152/162 may be a kernel-space thread (as shown in FIG. 2) or a user-space thread. Various examples will be explained below using FIGS. 4-6

Automatic Detection

Figure 4:
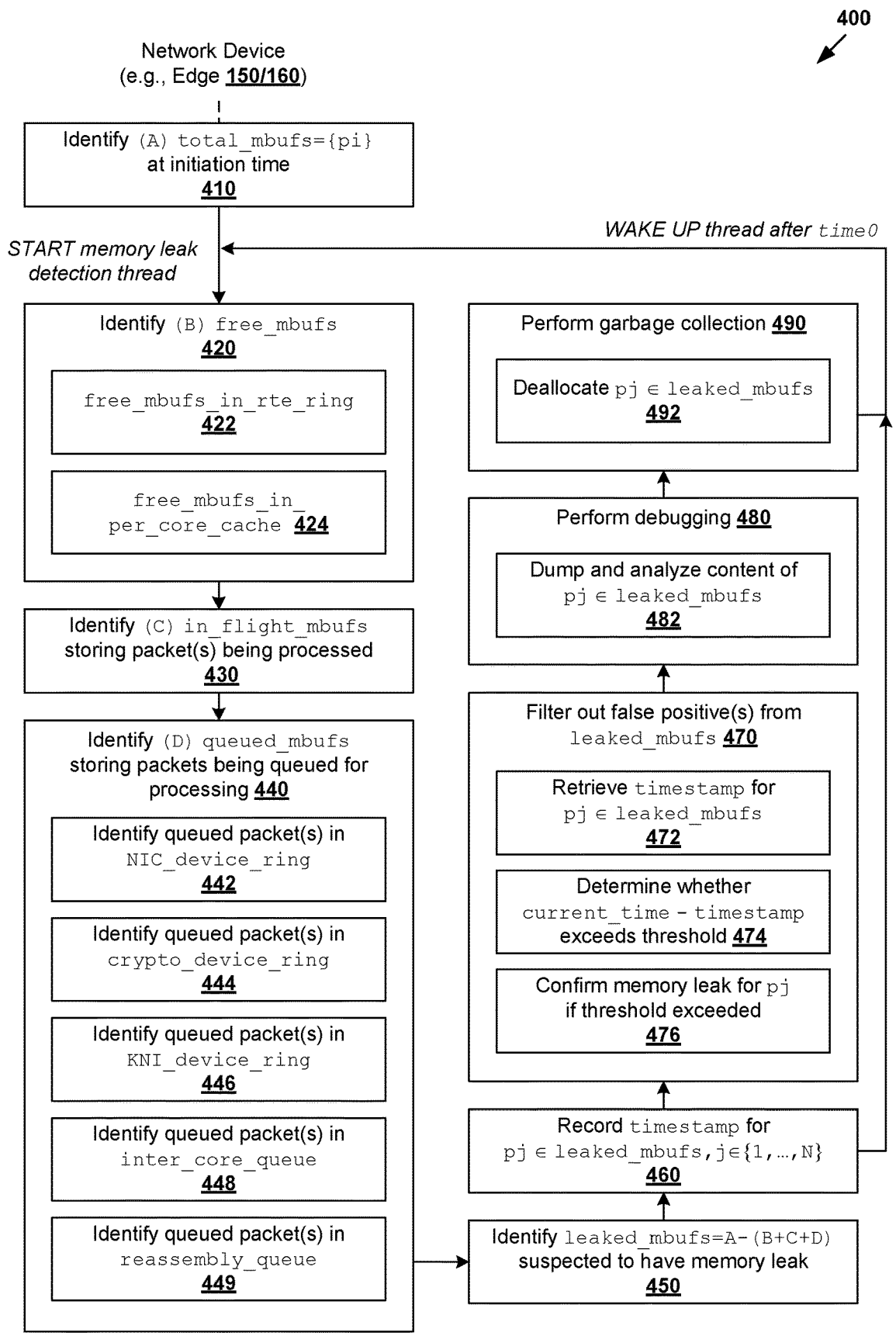
FIG. 4 is a flowchart of an example detailed process for a network device to perform memory leak detection.
Figure 5:
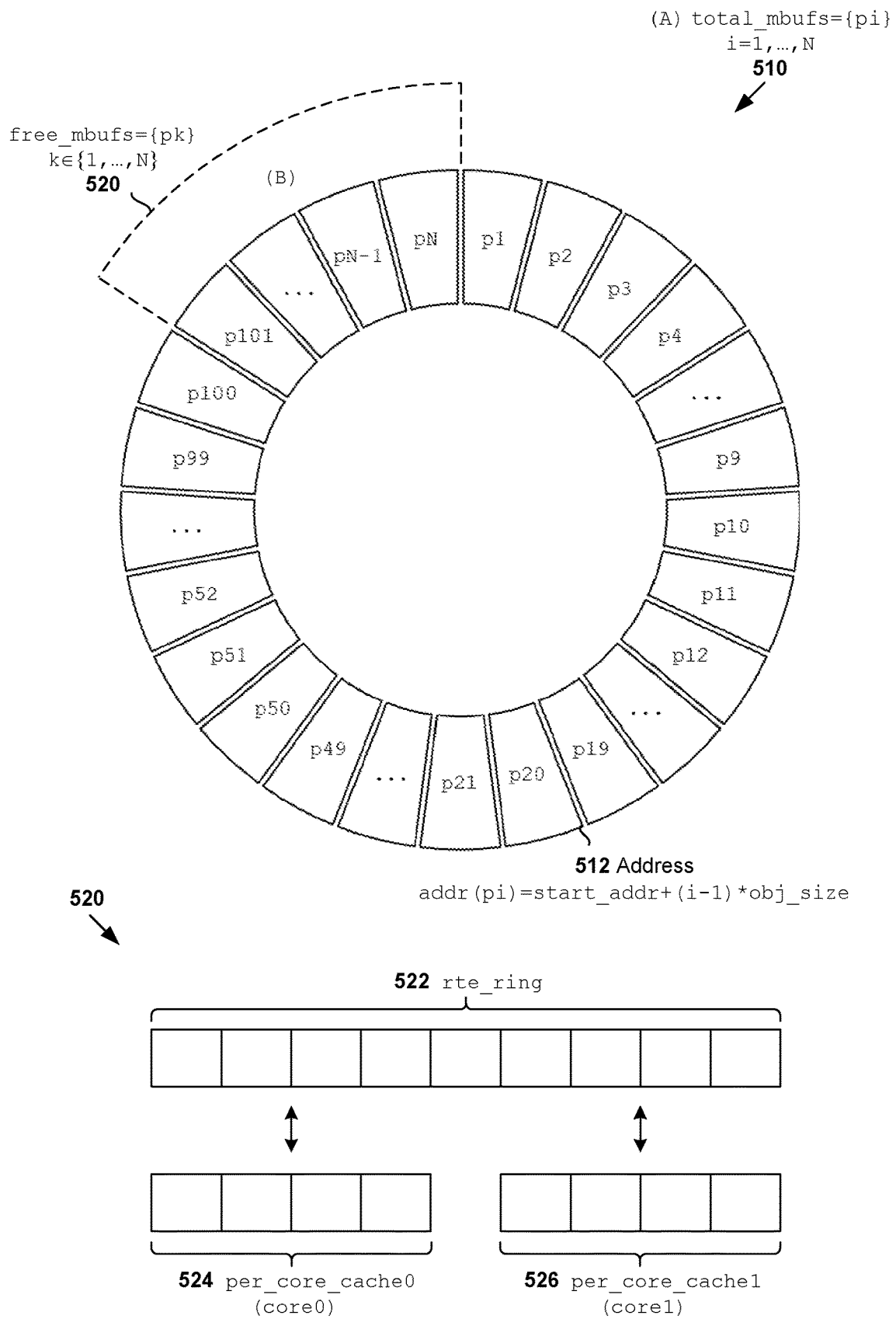
FIG. 5 is a schematic diagram illustrating an example set of memory buffers configured for a network device.
Figure 6:
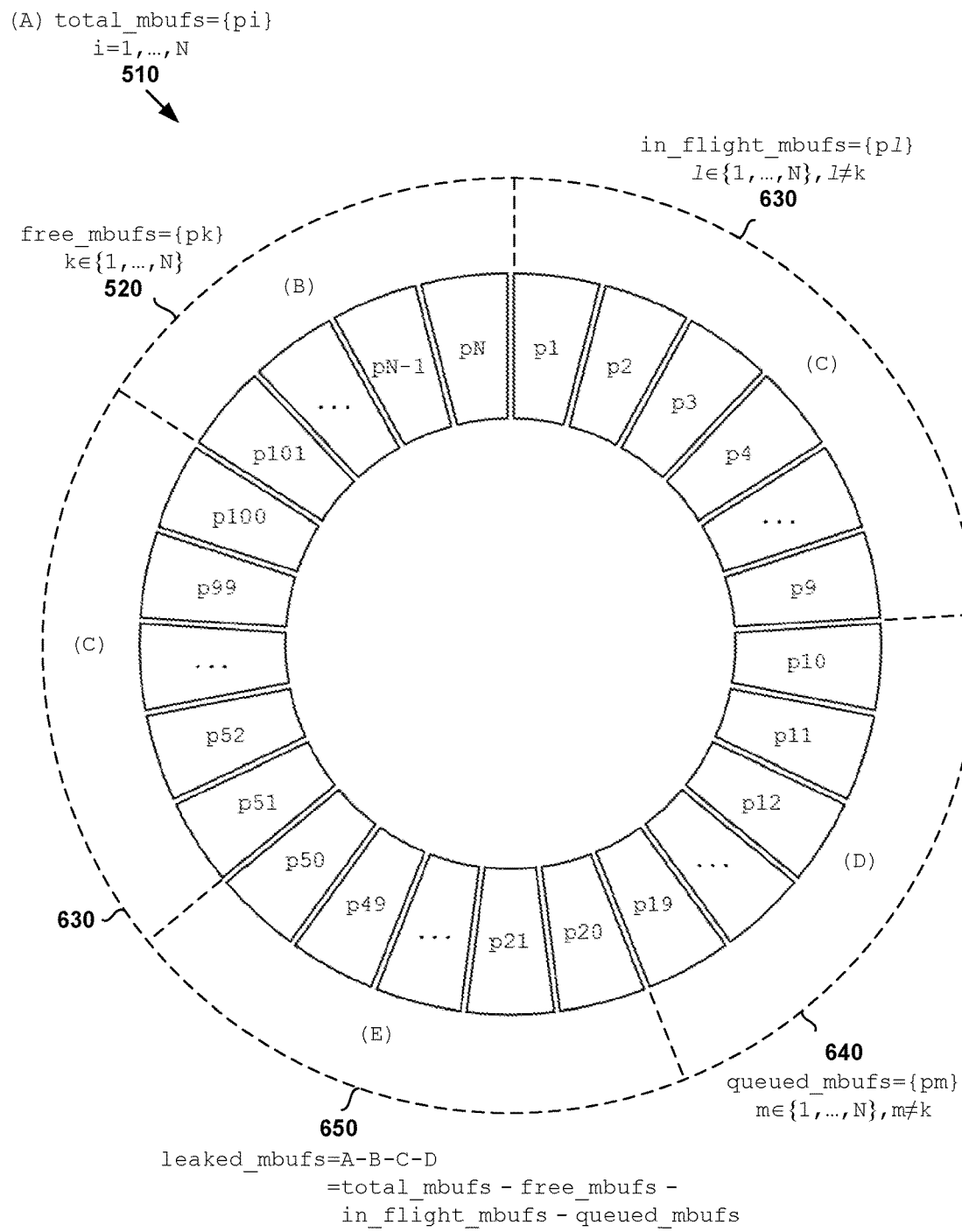
FIG. 6 is a schematic diagram illustrating an example of memory leak detection and remediation performed by a network device.

FIG. 4 is a flowchart of example detailed process 400 for a network device to perform memory leak detection. Example process 400 may include one or more operations, functions, or actions illustrated by one or more blocks, such as 410 to 492. The various blocks may be combined into fewer blocks, divided into additional blocks, and/or eliminated depending on the desired implementation. The example in FIG. 4 will be explained using FIG. 5 and FIG. 6. In particular, FIG. 5 is a schematic diagram illustrating an example set of memory buffers configured for a network device. FIG. 6 is a schematic diagram illustrating an example of memory leak detection and remediation performed by a network device.

(a) Set of Memory Buffers

At 410 in FIG. 4, in response to detecting an initialization of mempool, detection thread 152/162 may identify a set of N memory buffers that are available for storing packet information that requires processing by edge 150/160. As shown at 510 in the example in FIG. 5, the set may be denoted as total_mbufs={pi}, where index i=1, ..., N, pi represents the $i^{th}$ memory buffer in the set, and N represents the size of the set. The set represents a snapshot of mempool at initialization. Any suitable size N may be used, such as N>100 in FIG. 5.

As an optimization strategy, the datapath of edge 150/160 may use contiguous virtual memory associated with a start address (start_addr) and an end address (end_addr). With a fixed object size (obj_size), the virtual memory address of the $i^{th}$ memory buffer (pi) may be derived as: addr(pi)=start_addr+(i−1)*obj_size. For example, addr(p1)=start_addr for i=1, addr(p2)=start_addr+obj_size for i=2, addr(p3)=start_addr+2*obj_size for i=3, and so on until the end address of mempool is reached. Block 410 may further involve storing the address information {addr(pi)} and any other information associated with each pi in any suitable data store, such as a hash table. In practice, block 410 is performed right after mempool is initialized, and allocates objects and places them into a data structure (e.g., rte_ring 522).

(b) First Subset

At 420 in FIG. 4, detection thread 152/162 may identify a first subset of first memory buffers (free_mbufs) that are unallocated or free. In the example in FIG. 5, the first subset (see 520) may be denoted as free_mbufs={pk}, where pk represents a particular first memory buffer in the first subset, and index k∈{1, ..., N}. In practice, an unallocated memory buffer may be stored in a ring buffer (rte_ring) or a per-core object cache. In this case, block 420 may involve iterating through rte_ring (see 422) and/or a per_core_cache (see 424) to identify unallocated memory buffer(s).

Two caches are shown in FIG. 5: a first cache (per_core_cache0) for a first core (core 0) at 524, and a second cache (per_core_cache1) for a second core (core 1) at 526. For example, one core may be configured as a service core to handle resource-intensive packet processing tasks, and another core for control protocol implementation (e.g., address resolution protocol, etc.). Similar to CPU architecture, application(s) running on the first core will allocate memory buffer(s) from first cache 524, while application(s) running on the second core will allocate memory buffer(s) from second cache 526. If the amount of memory buffers is insufficient in particular cache 524/526, the application may allocate more memory buffer(s) from rte_ring 522. However, if there are insufficient mbufs in rte_ring, the application will be out of memory, and packet processing will be stalled.

(c) Second Subset

At 430-440 in FIG. 4, detection thread 152/162 may identify a second subset of second memory buffers that are allocated and storing packet information that is being processed by component(s) of edge 150/160. For example, block 430 may involve identifying in_flight_mbufs based on various components (e.g., fast-path threads) that perform packet processing along datapath 201-208. In the example in FIG. 6, each memory buffer in in_flight_mbufs (see 630) may be denoted as pl, where index l∈{1, ..., N} (i.e., a member of set 510) and l≠k (i.e., not a member of free_mbufs).

Block 440 may involve identifying queued_mbufs that includes memory buffer(s) holding packet(s) being queued for processing. In the example in FIG. 6, each memory buffer in queued_mbufs (see 640) may be denoted as pm, where index m∈{1, ..., N} (i.e., a member of set 510) and m≠k (i.e., not a member of free_mbufs). Depending on the desired implementation, edge 150/160 may implement any suitable number of queues to facilitate various packet processing functions.

At 442 in FIG. 4, queued_mbufs may be identified based on queue(s) maintained by NIC 220/230 in FIG. 2, such as TX queue and/or RX queue (also known as NIC device ring buffers). At 444, queued_mbufs may be identified based on cryptographic device ring buffer (not shown in FIG. 2), which may be a cryptographic queue that stores packets to which cryptographic algorithm(s) are applied asynchronously. For example, packet encryption and decryption may be performed to implement VPN tunnel 180 connecting edges 150-160. At 446, queued_mbufs may be identified based on queue(s) maintained by KNI 250, which may include TX queue 251 and RX queue 252 (also known as KNI device ring buffers) to facilitate inter-process communication.

At 448 in FIG. 4, queued_mbufs may be identified based on an inter-core queue (not shown in FIG. 2), which may be a queue that stores packets that are dispatched to a different core for processing. For example, packets requiring compute-intensive tasks may be dispatched to a dedicated service core, packets requiring address resolution protocol (ARP) support may be dispatched to a core running the protocol. Further, at 449, queued_mbufs may be identified based on a reassembly queue (not shown in FIG. 2) that stores packet fragments of a (large) packet that requires reassembly. For example, when packet fragments reach edge 150/160, a firewall component may rely on reassembly before applying firewall rule(s) on the reassembled or completed packet.

(d) Third Subset

At 450 in FIG. 4, detection thread 152/162 may identify a third subset of third memory buffers (i.e., leaked memory buffers). In the example in FIG. 6, each memory buffer in leaked_mbufs (see 650) may be denoted as pj, where index j∈{1, ..., N} (i.e., a member of set 510). Block 450 may involve performing a comparison using the following diff operation:

$$leaked\_mbufs=total\_mbufs-free\_mbufs-in\_flight\_mbufs-queued\_mbufs$$

In other words, the comparison is to identify any difference(s) between (a) the original snapshot (i.e., total_mbufs), and (b) a collection or union of first subset (i.e., free_mbufs) and second subset (i.e., in_flight_mbufs and/or queued_mbufs). In the example in FIG. 6, consider the scenario where total_mbufs={p1, ..., pN} (see 510), free_mbufs={p101, ..., pN} (see 520), in_flight_mbufs={p1, ..., p9, p51, ..., p100} (see 630) and queued_mbufs={p10, ..., p19} (see 640). Based on the comparison, leaked_mbufs={p20, ..., p50} (see 650). Each pj in leaked_mbufs is suspected to be a leaked memory buffer.

In practice, there is a possibility of false positive(s) in leaked_mbufs, such as when detection thread 152/162 does not lock or freeze packet processing functions when identifying queued_mbufs. For example, detection thread 152/162 may collect queued packets in a TX queue in NIC2 230 prior to those in a cryptographic device ring buffer (see also 442-444). By the time detection thread 152/162 checks the latter, a few packets that have completed their required cryptographic operations may be moved to the TX queue for egress transmission via NIC2 230. These packets may be false positives that are mistakenly included in leaked_mbufs.

(e) False Positives

At 460-470 in FIG. 4, suspected leaked memory buffers (pj) in leaked_mbufs (see 650) may be monitored to filter out any false positive(s). In particular, in response to identifying each suspected leaked memory buffer (pj), a timestamp value indicating the time of detection may be stored, such as in a private data area of the memory buffer. As shown at 660 in FIG. 6, timestamp=time1 may be stored for each suspected leaked memory buffer in leaked_mbufs={p20, . . . , p50}. If a particular memory buffer (pj) is recycled (i.e., freed and re-allocated), the timestamp in the private data area will be reset.

The next time detection thread 152/162 wakes up (e.g., time2) and performs a subsequent iteration, the timestamp associated with a particular memory buffer (pj) in leaked_mbufs may be retrieved (see 472). An elapsed time since the timestamp (i.e., when detection occurs) may be monitored. In response to determination that the time elapsed has exceeded a threshold (see 474), it is assumed that the particular pj is a leaked memory buffer (see 476) and not a false positive. At 670 in FIG. 6, it is determined that the threshold is exceeded (i.e., time2−time1>threshold) for {p20, . . . , p49}. At 680 in FIG. 6, the remaining memory buffer p50 may be identified as a false positive based on a reset of its timestamp=time1 when it is recycled.

In practice, any suitable threshold may be set to identify false positive(s). One assumption is that any non-queued memory buffers shall not be used for longer than a predetermined time period (e.g., threshold=10 minutes). Edge 150/160 is generally configured to have a high packet rate (e.g., millions of packets per second) and packets are forwarded, dropped or queued. If a packet is not queued but active or stored for a long time, a memory buffer storing the packet is suspected to be leaked. Depending on the desired implementation, more complex heuristics may be implemented to identify false positive(s) at block 470 in FIG. 4.

Automatic Remediation

According to examples of the present disclosure, remediation action(s) may be performed automatically at runtime. At 480-482 in FIG. 4, in response to identifying a leaked memory buffer (pj), detection thread 152/162 may perform dump content of the leaked memory buffer (pj) to a file for analysis and debugging. In practice, the content may include header information and/or payload information of a packet (or a fragment) stored in the leaked memory buffer (pj). The content may also include path information associated with the packet, such as which code path the packet went through, which interface(s) that forwarded or dropped the packet. The content may be analyzed to identify the root cause of the memory leak.

At 490-492 in FIG. 4, in response to identifying a leaked memory buffer (pj), detection thread 152/162 may perform automatic garbage collection by deallocating the leaked memory buffer (pj) such that it may be re-allocated. Unlike conventional approaches that may be costly and cause network functionality disruption, it is not necessary for a user (e.g., network administrator) to intervene and to restart the datapath of edge 150/160.

Container Implementation

Although discussed using various VMs, it should be understood that memory leak detection may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside a particular VM, where a different VNIC is configured for each container. Each container is "OS-less", meaning that it does not include any OS that could weigh 11s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as a network device may be deployed to perform memory leak detection.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network device to perform memory leak detection, wherein the method comprises:
    identifying a set of memory buffers that are available for storing packet information that requires processing by the network device;
    identifying, from the set, a first subset that includes one or more first memory buffers that are unallocated, and a second subset that includes one or more second memory buffers that are allocated and storing packet information that is being processed by the network device;
    performing a comparison between (a) the set of memory buffers and (b) the first subset and the second subset; and
    based on the comparison, identifying a third subset that includes one or more third memory buffers, being leaked memory buffers, that are storing packet information that is no longer being processed by the network device.

2. The method of claim 1, wherein the method further comprises one or more of the following:
    performing a first remediation action to deallocate a particular leaked memory buffer from the third subset; and
    performing a second remediation action to dump content of the particular leaked memory buffer to a file for analysis and debugging, wherein the content includes packet header information or payload information.

3. The method of claim 1, wherein identifying the third subset comprises:
    determining that a particular leaked memory buffer from the third subset is not a false positive.

4. The method of claim 3, wherein identifying the third subset comprises:
    monitoring an elapsed time since the particular leaked memory buffer from the third subset is identified; and
    in response to detecting that the elapsed time has exceeded a predetermined threshold, determining that the particular leaked memory buffer is not a false positive.

5. The method of claim 1, wherein identifying the second subset comprises:
    identifying a particular second memory buffer storing packet information that is being processed by a packet processing component of the network device, or being queued for processing by the packet processing component.

6. The method of claim 5, wherein identifying the second subset comprises:
    identifying the particular second memory buffer based on one or more of the following: a network interface controller (NIC) queue, a cryptographic queue, a kernel NIC interface (KNI) queue, an inter-core queue, and a packet reassembly queue.

7. The method of claim 1, wherein the method further comprises:
    executing, on the network device, a memory leak detection thread to identify the set of memory buffers at initialization of a memory pool, and to identify the first subset, the second subset and the third subset periodically.

8. A non-transitory computer-readable storage medium that includes a set of instructions which, in response to execution by a processor of a network device, cause the processor to perform a method of memory leak detection, wherein the method comprises:
    identifying a set of memory buffers that are available for storing packet information that requires processing by the network device;
    identifying, from the set, a first subset that includes one or more first memory buffers that are unallocated, and a second subset that includes one or more second memory buffers that are allocated and storing packet information that is being processed by the network device;
    performing a comparison between (a) the set of memory buffers and (b) the first subset and the second subset; and
    based on the comparison, identifying a third subset that includes one or more third memory buffers, being leaked memory buffers, that are storing packet information that is no longer being processed by the network device.

9. The non-transitory computer-readable storage medium of claim 8, wherein the method further comprises one or more of the following:
    performing a first remediation action to deallocate a particular leaked memory buffer from the third subset; and
    performing a second remediation action to dump content of the particular leaked memory buffer to a file for analysis and debugging, wherein the content includes packet header information or payload information.

10. The non-transitory computer-readable storage medium of claim 8, wherein identifying the third subset comprises:
    determining that a particular leaked memory buffer from the third subset is not a false positive.

11. The non-transitory computer-readable storage medium of claim 10, wherein identifying the third subset comprises:
    monitoring an elapsed time since the particular leaked memory buffer from the third subset is identified; and
    in response to detecting that the elapsed time has exceeded a predetermined threshold, determining that the particular leaked memory buffer is not a false positive.

12. The non-transitory computer-readable storage medium of claim 8, wherein identifying the second subset comprises:
    identifying a particular second memory buffer storing packet information that is being processed by a packet processing component of the network device, or being queued for processing by the packet processing component.

13. The non-transitory computer-readable storage medium of claim 12, wherein identifying the second subset comprises:
    identifying the particular second memory buffer based on one or more of the following: a network interface controller (NIC) queue, a cryptographic queue, a kernel NIC interface (KNI) queue, an inter-core queue, and a packet reassembly queue.

14. The non-transitory computer-readable storage medium of claim 8, wherein the method further comprises:
executing, on the network device, a memory leak detection thread to identify the set of memory buffers at initialization of a memory pool, and to identify the first subset, the second subset and the third subset periodically.

15. A computer system, comprising:
a processor;
a non-transitory computer-readable medium having stored thereon instructions that, when executed by the processor, cause the processor to:
identify a set of memory buffers that are available for storing packet information that requires processing by the computer system;
identify, from the set, a first subset that includes one or more first memory buffers that are unallocated, and a second subset that includes one or more second memory buffers that are allocated and storing packet information that is being processed by the computer system;
perform a comparison between (a) the set of memory buffers and (b) the first subset and the second subset; and
based on the comparison, identify a third subset that includes one or more third memory buffers, being leaked memory buffers, that are storing packet information that is no longer being processed by the computer system.

16. The computer system of claim 1, wherein the instructions further cause the processor to perform one or more of the following:
perform a first remediation action to deallocate a particular leaked memory buffer from the third subset; and
perform a second remediation action to dump content of the particular leaked memory buffer to a file for analysis and debugging, wherein the content includes packet header information or payload information.

17. The computer system of claim 15, wherein the instructions for identifying the third subset cause the processor to:
determine that a particular leaked memory buffer from the third subset is not a false positive.

18. The computer system of claim 17, wherein the instructions for identifying the third subset cause the processor to:
monitor an elapsed time since the particular leaked memory buffer from the third subset is identified; and
in response to detecting that the elapsed time has exceeded a predetermined threshold, determine that the particular leaked memory buffer is not a false positive.

19. The computer system of claim 15, wherein the instructions for identifying the second subset cause the processor to:
identify a particular second memory buffer storing packet information that is being processed by a packet processing component of the computer system, or being queued for processing by the packet processing component.

20. The computer system of claim 19, wherein the instructions for identifying the second subset cause the processor to:
identify the particular second memory buffer based on one or more of the following: a network interface controller (NIC) queue, a cryptographic queue, a kernel NIC interface (KNI) queue, an inter-core queue, and a packet reassembly queue.

21. The computer system of claim 15, wherein the instructions further cause the processor to:
execute, on the computer system, a memory leak detection thread to identify the set of memory buffers at initialization of a memory pool, and to identify the first subset, the second subset and the third subset periodically.

* * * * *